Patented Aug. 4, 1936

2,050,209

UNITED STATES PATENT OFFICE 2,050,209

WAX-LIKE COMPOSITION

Samuel D. Gehman, Akron, Ohio, assignor to Wingfoot Corporation, Wilmington, Del., a corporation of Delaware No Drawing. Application July 17, 1934, Serial No. 735,691

12 Claims. (Cl. 106—23)

This invention relates to wax-like compositions made from a wax and a condensation derivative of rubber. The invention includes both the new products and methods of preparing them. Although the new compositions appear and feel like and in other respects simulate waxes, nevertheless they have certain technical virtues not present in the waxes from which they are made. These wax-like compositions may be used in various ways in the place of waxes, as for example, in moisture-proofing and polishing, in the manufacture of electrical insulation, molded products, thermo-plastics and thermo-plastic coatings, etc. By the use of these wax-like compositions for coating paper, etc. wrapping materials are obtained which have improved heat-sealing properties, as compared to the ordinary waxed papers, etc.

The condensation derivatives of rubber from which the wax-like compositions of this invention are prepared may be formed in different ways and may have a higher or lower softening point. Products of a higher softening point are obtained by carrying the condensation reaction further than when condensation derivatives of lower softening point are produced. In the preparation of these products, rubber may be treated with various condensing agents such, for example, as the halides of amphoteric metals, such as tin tetra chloride, ferric chloride, etc. or with a compound such as chlorostannic acid. With condensing agents such as tin tetra chloride a condensation derivative which is substantially a hydrocarbon is obtained. With a compound such as chlorostannic acid a chlorine-containing derivative is produced. Using different condensation agents, products of somewhat different elemental structure may be produced. To prepare the condensation derivative of rubber pale crepe rubber which has been plasticized to a plasticity of 300 as measured by a Williams plastometer may be dissolved in sufficient benzene to form a 10% solution. To 350 gallons of this cement ten per cent of hydrated chlorostannic acid $$H_2SnCl_6.6H_2O$$

is added and heated under a reflux condenser at or near the boiling point of the cement until the reaction has progressed to a point to give a final product of desired softening point, etc. The reacted cement is then poured into a large volume of water, e. g. about 550 gallons, with stirring. Sodium sulfite is advantageously added to the water to prevent oxidation. The emulsion produced is steam distilled and the condensation derivative of rubber thus precipitated. The product is thus obtained in a subdivided state in which form it can be readily dissolved in the melted wax or otherwise compounded with the wax. A condensation derivative with a softening point of about 50 to 70° C. will ordinarily prove most satisfactory for compounding with wax.

Wax and condensation derivatives of rubber have been found to blend homogeneously in all proportions. The two materials may be homogeneously dispersed by milling on a rubber mill. Or the wax may be melted and the rubber derivative in its subdivided state added with agitation and the application of sufficient heat to form a homogeneous mixture. The wax and rubber derivative are miscible when dissolved separately or together in a solvent such as benzene or gasoline, and solutions of the composition may readily be obtained by dissolving the ingredients separately in the same or different solvents and mixing the solutions, or dissolving the ingredients together or at different times in the same batch of a mutual solvent and if desired the solvent can then be removed by distillation. In this latter method of preparation it is best to mill the rubber derivative on a rubber mill prior to dissolving.

The wax and rubber derivative may be mixed in any desired proportions, but the preferred form of the invention includes wax-like compositions which contain at least 20 or 25% or more of wax. Compositions have been made containing 25, 50, and 75% of wax, respectively, the balance being the chlorine-containing condensation derivative of rubber described herein. These compositions were all wax-like in appearance and felt somewhat like wax. They had different softening points, depending upon the amount of wax and rubber derivative present and, in general, their physical properties graded from properties similar to wax to properties similar to the rubber derivative as the amount of rubber derivative was increased. Fabrics may be coated with these wax-like compositions for various purposes. Paper coated with the rubber derivative and paraffin wax forms a heat-sealing, water-proof wrapping material. A molten mixture of the two may be spread on to the paper or it may be coated with a solution in a volatile solvent. For this purpose a composition containing from about 15 or 20 to 25 or 30% of the condensation derivative of rubber and even up to 50 or 60% will be satisfactory, and a high melting paraffin may be preferred.

By mixing the rubber derivative and paraffin in different proportions wax-like compositions of different softening points are obtained. The softening point may also be regulated by using paraffins of different melting point and condensation derivatives which have been reacted to different end points.

The invention is not limited to the use of paraffin in the wax-like compositions described, but other waxes including beeswax, stearic acid and other animal or vegetable waxes, etc. and mixtures of various waxes may be employed. Satisfactory wax-like compositions have been produced from the waxes known in the trade as Halowaxes (chlorinated naphthalenes) and Arochlors (chlorinated biphenyls made by the Swann Chemical Company). Various plasticizers, coloring materials, pigments, etc. may be added to the wax-like compositions for special purposes.

I claim:

1. A meltable wax-like composition comprising at least 20% by weight of wax and the balance composed largely of a condensation derivative of rubber obtainable by decomposing with water a product obtained by treating rubber in solution with chlorostannic acid or a halide of an amphoteric metal.

2. A meltable wax-like composition composed largely of paraffin and a condensation derivative of rubber obtainable by decomposing with water a product obtained by treating rubber in solution which chlorostannic acid or a halide of an amphoteric metal.

3. A meltable wax-like composition composed essentially of paraffin and a condensation derivative of rubber obtainable by decomposing with water a product obtained by treating rubber in solution with chlorostannic acid or a halide of an amphoteric metal, and containing at least 20% by weight of paraffin.

4. A solution of a wax-like composition which is composed essentially of a common solvent at least 20 parts by weight of wax and up to 80 parts by weight of a condensaation derivative of rubber obtainable by decomposing with water a product obtained by treating rubber in solution with chlorostannic acid or a halide of an amphoteric metal.

5. A solution of a wax-like composition which is composed essentially of a common solvent at least 20 parts by weight of paraffin and up to 80 parts by weight of a condensation derivative of rubber obtainable by decomposing with water a product obtained by treating rubber in solution with chlorostannic acid or a halide of an amphoteric metal.

6. The method of making meltable wax-like compositions which comprises mixing at least 20% by weight of wax with a condensation derivative of rubber obtainable by decomposing with water a product obtained by treating rubber in solution with chlorostannic acid or a halide of an amphoteric metal.

7. The method of preparing a meltable wax-like composition which comprises melting wax and then dispersing therein a condensation derivative of rubber obtainable by decomposing with water a product obtained by treating rubber in solution with chlorostannic acid or a halide of an amphoteric metal.

8. The method of preparing a meltable wax-like composition which comprises dispersing on a rubber mill at least 20% by weight of a wax and a condensation derivative of rubber obtainable by decomposing with water a product obtained by treating rubber in solution with chlorostannic acid or a halide of an amphoteric metal.

9. The method of preparing solutions of wax-like compositions which comprises dissolving in a common solvent wax and a condensation derivative of rubber obtainable by decomposing with water a product obtained by treating rubber in solution with chlorostannic acid or a halide of an amphoteric metal.

10. The method of preparing meltable wax-like compositions which comprises dissolving in a common solvent wax and a condensation derivative of rubber obtainable by decomposing with water a product obtained by treating rubber in solution with chlorostannic acid or a halide of an amphoteric metal, and then evaporating the solvent.

11. A wrapping material which comprises a heat-sealing coating containing wax and at least 15 and no more than about 60% of a condensation derivative of rubber obtainable by decomposing with water a product obtained by treating rubber in solution with chlorostannic acid or a halide of an amphoteric metal.

12. A meltable wax-like composition composed essentially of paraffin and a condensation derivative of rubber and containing no more than 50 parts by weight of the rubber derivative, which rubber derivative is obtainable by decomposing with water the reaction product formed from rubber in solution by treatment with chlorostannic acid or the halide of an amphoteric metal.

SAMUEL D. GEHMAN.

DISCLAIMER 2,050,209.—*Samuel D. Gehman*, Akron, Ohio. WAX-LIKE COMPOSITION. Patent dated August 4, 1936. Disclaimer filed October 30, 1937, by the assignee, *Wingfoot Corporation*.

Hereby enters this disclaimer of each and every claim.

[*Official Gazette November 16, 1937.*]

softening point may also be regulated by using paraffins of different melting point and condensation derivatives which have been reacted to different end points.

The invention is not limited to the use of paraffin in the wax-like compositions described, but other waxes including beeswax, stearic acid and other animal or vegetable waxes, etc. and mixtures of various waxes may be employed. Satisfactory wax-like compositions have been produced from the waxes known in the trade as Halowaxes (chlorinated naphthalenes) and Arochlors (chlorinated biphenyls made by the Swann Chemical Company). Various plasticizers, coloring materials, pigments, etc. may be added to the wax-like compositions for special purposes.

I claim:

1. A meltable wax-like composition comprising at least 20% by weight of wax and the balance composed largely of a condensation derivative of rubber obtainable by decomposing with water a product obtained by treating rubber in solution with chlorostannic acid or a halide of an amphoteric metal.

2. A meltable wax-like composition composed largely of paraffin and a condensation derivative of rubber obtainable by decomposing with water a product obtained by treating rubber in solution which chlorostannic acid or a halide of an amphoteric metal.

3. A meltable wax-like composition composed essentially of paraffin and a condensation derivative of rubber obtainable by decomposing with water a product obtained by treating rubber in solution with chlorostannic acid or a halide of an amphoteric metal, and containing at least 20% by weight of paraffin.

4. A solution of a wax-like composition which is composed essentially of a common solvent at least 20 parts by weight of wax and up to 80 parts by weight of a condensaation derivative of rubber obtainable by decomposing with water a product obtained by treating rubber in solution with chlorostannic acid or a halide of an amphoteric metal.

5. A solution of a wax-like composition which is composed essentially of a common solvent at least 20 parts by weight of paraffin and up to 80 parts by weight of a condensation derivative of rubber obtainable by decomposing with water a product obtained by treating rubber in solution with chlorostannic acid or a halide of an amphoteric metal.

6. The method of making meltable wax-like compositions which comprises mixing at least 20% by weight of wax with a condensation derivative of rubber obtainable by decomposing with water a product obtained by treating rubber in solution with chlorostannic acid or a halide of an amphoteric metal.

7. The method of preparing a meltable wax-like composition which comprises melting wax and then dispersing therein a condensation derivative of rubber obtainable by decomposing with water a product obtained by treating rubber in solution with chlorostannic acid or a halide of an amphoteric metal.

8. The method of preparing a meltable wax-like composition which comprises dispersing on a rubber mill at least 20% by weight of a wax and a condensation derivative of rubber obtainable by decomposing with water a product obtained by treating rubber in solution with chlorostannic acid or a halide of an amphoteric metal.

9. The method of preparing solutions of wax-like compositions which comprises dissolving in a common solvent wax and a condensation derivative of rubber obtainable by decomposing with water a product obtained by treating rubber in solution with chlorostannic acid or a halide of an amphoteric metal.

10. The method of preparing meltable wax-like compositions which comprises dissolving in a common solvent wax and a condensation derivative of rubber obtainable by decomposing with water a product obtained by treating rubber in solution with chlorostannic acid or a halide of an amphoteric metal, and then evaporating the solvent.

11. A wrapping material which comprises a heat-sealing coating containing wax and at least 15 and no more than about 60% of a condensation derivative of rubber obtainable by decomposing with water a product obtained by treating rubber in solution with chlorostannic acid or a halide of an amphoteric metal.

12. A meltable wax-like composition composed essentially of paraffin and a condensation derivative of rubber and containing no more than 50 parts by weight of the rubber derivative, which rubber derivative is obtainable by decomposing with water the reaction product formed from rubber in solution by treatment with chlorostannic acid or the halide of an amphoteric metal.

SAMUEL D. GEHMAN.

DISCLAIMER 2,050,209.—*Samuel D. Gehman*, Akron, Ohio. WAX-LIKE COMPOSITION. Patent dated August 4, 1936. Disclaimer filed October 30, 1937, by the assignee, *Wingfoot Corporation*.

Hereby enters this disclaimer of each and every claim.

[*Official Gazette November 16, 1937*.]

DISCLAIMER 2,050,209.—*Samuel D. Gehman*, Akron, Ohio. WAX-LIKE COMPOSITION. Patent dated August 4, 1936. Disclaimer filed October 30, 1937, by the assignee, *Wingfoot Corporation*.

Hereby enters this disclaimer of each and every claim.

[*Official Gazette November 16, 1937.*]